United States Patent
Martini (10) Patent No.: US 10,218,807 B2
(45) Date of Patent: *Feb. 26, 2019

(54) NETWORK TRAFFIC MANAGEMENT USING PORT NUMBER REDIRECTION

(71) Applicant: iBoss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,480

(22) Filed: Aug. 11, 2017

(65) Prior Publication Data

US 2017/0366635 A1    Dec. 21, 2017

Related U.S. Application Data

(63) Continuation of application No. 15/273,534, filed on Sep. 22, 2016, now Pat. No. 9,742,859, which is a continuation of application No. 14/987,486, filed on Jan. 4, 2016, now Pat. No. 9,473,586, which is a continuation of application No. 14/709,160, filed on May 11, 2015, now Pat. No. 9,231,857, which is a continuation of application No. 14/566,587, filed on Dec. 10, 2014, now Pat. No. 9,118,582.

(51) Int. Cl.
*H04L 29/08* (2006.01)
*H04L 29/06* (2006.01)
*H04L 12/707* (2013.01)
*H04L 12/741* (2013.01)

(52) U.S. Cl.
CPC .......... *H04L 67/2814* (2013.01); *H04L 29/06* (2013.01); *H04L 45/22* (2013.01); *H04L 45/74* (2013.01); *H04L 63/08* (2013.01); *H04L 67/02* (2013.01); *H04L 67/146* (2013.01); *H04L 67/2842* (2013.01); *H04L 67/32* (2013.01)

(58) Field of Classification Search
CPC .......... H04L 29/12066; H04L 61/1511; H04L 63/0263; H04L 47/10; H04L 69/22; H04L 47/2441; H04L 47/19
See application file for complete search history.

(56) References Cited

U.S. PATENT DOCUMENTS

| | | |
|---|---|---|
| 5,941,954 A | 8/1999 | Kalajan |
| 6,246,680 B1 | 6/2001 | Muller et al. |

(Continued)

OTHER PUBLICATIONS

DD-WRT.com, "HTTP Redirect", Jun. 12, 2010, downloaded from the internet at: http://www.dd-wrt.com/wiki/index.php/HTTPRedirect on Oct. 1, 2014, 2 pages.

(Continued)

*Primary Examiner* — Ninos Donabed
(74) *Attorney, Agent, or Firm* — Fish & Richardson P.C.

(57) ABSTRACT

A first request is received from a device over a network. It is determined that the first request should be redirected, based at least in part on information included in the first request. A redirect message is sent to the device over the network. A second request is received that includes the address and the port number. Responsive to determining that the port number is on the predetermined list of port numbers, modifying the second request by removing the port number. The modified second request is sent to the address.

12 Claims, 5 Drawing Sheets

(56) References Cited

U.S. PATENT DOCUMENTS

| | | | |
|---|---|---|---|
| 6,954,459 B1 | 10/2005 | Vaidhyanathan et al. | |
| 7,107,334 B1* | 9/2006 | Shaffer | H04L 45/00 |
| | | | 370/218 |
| 7,161,947 B1 | 1/2007 | Desai | |
| 7,899,932 B2 | 3/2011 | Takeda | |
| 8,713,641 B1 | 4/2014 | Pagan | |
| 8,996,603 B2 | 3/2015 | Burshan et al. | |
| 2002/0009079 A1 | 1/2002 | Jungck | |
| 2002/0065938 A1 | 5/2002 | Jungck | |
| 2002/0091801 A1* | 7/2002 | Lewin | H04L 29/06 |
| | | | 709/219 |
| 2002/0116481 A1 | 8/2002 | Lee | |
| 2002/0120782 A1 | 8/2002 | Dillon | |
| 2002/0169830 A1 | 11/2002 | Mild | |
| 2003/0147403 A1 | 8/2003 | Border | |
| 2003/0172264 A1 | 9/2003 | Dillon | |
| 2003/0177283 A1 | 9/2003 | Hamilton | |
| 2003/0208621 A1 | 11/2003 | Bowman | |
| 2004/0153665 A1 | 8/2004 | Browne | |
| 2005/0021863 A1 | 1/2005 | Jungck | |
| 2005/0138413 A1 | 6/2005 | Lippmann et al. | |
| 2005/0149531 A1 | 7/2005 | Srivastava | |
| 2005/0165932 A1 | 7/2005 | Banerjee | |
| 2005/0198374 A1 | 9/2005 | Suzuki | |
| 2006/0056317 A1 | 3/2006 | Manning et al. | |
| 2006/0059092 A1 | 3/2006 | Burshan et al. | |
| 2006/0130064 A1 | 6/2006 | Srivastava | |
| 2006/0212572 A1* | 9/2006 | Afek | H04L 63/145 |
| | | | 709/225 |
| 2006/0233155 A1 | 10/2006 | Srivastava | |
| 2006/0277346 A1 | 12/2006 | Doak | |
| 2007/0038853 A1 | 2/2007 | Day | |
| 2007/0150594 A1 | 6/2007 | Andreev | |
| 2007/0156900 A1 | 7/2007 | Chien | |
| 2007/0195793 A1 | 8/2007 | Grosser et al. | |
| 2007/0276931 A1 | 11/2007 | Mandavi | |
| 2007/0283005 A1 | 12/2007 | Beliles | |
| 2008/0082662 A1 | 4/2008 | Dandliker | |
| 2008/0120433 A1 | 5/2008 | Cieslak | |
| 2008/0133536 A1* | 6/2008 | Bjorner | H03M 7/30 |
| 2008/0183878 A1 | 7/2008 | Panda et al. | |
| 2008/0244086 A1 | 10/2008 | Patel | |
| 2009/0003317 A1 | 1/2009 | Kasralikar et al. | |
| 2009/0003381 A1 | 1/2009 | Shamilian | |
| 2009/0013089 A1 | 1/2009 | Sullivan | |
| 2009/0055267 A1* | 2/2009 | Roker | G06F 17/3089 |
| | | | 705/14.1 |
| 2009/0059913 A1 | 3/2009 | Duato Marin et al. | |
| 2009/0059935 A1 | 3/2009 | Dec | |
| 2009/0262741 A1 | 10/2009 | Jungck | |
| 2010/0027544 A1* | 2/2010 | Li | H04L 45/00 |
| | | | 370/392 |
| 2010/0040057 A1 | 2/2010 | Ko | |
| 2010/0058329 A1 | 3/2010 | Durazzo | |
| 2010/0110881 A1 | 5/2010 | Ryoo et al. | |
| 2010/0124239 A1 | 5/2010 | Hughes | |
| 2010/0138559 A1* | 6/2010 | Sullivan | H04L 29/12066 |
| | | | 709/242 |
| 2010/0180043 A1 | 7/2010 | Lau | |
| 2010/0271964 A1 | 10/2010 | Akhter | |
| 2010/0281168 A1 | 11/2010 | Li | |
| 2011/0131478 A1 | 6/2011 | Tock | |
| 2011/0164506 A1 | 7/2011 | Stavrou | |
| 2012/0087233 A1 | 4/2012 | Wang et al. | |
| 2012/0114196 A1 | 5/2012 | Lee | |
| 2012/0130880 A1* | 5/2012 | Garlanger | G06Q 40/04 |
| | | | 705/37 |
| 2012/0290727 A1 | 11/2012 | Tivig | |
| 2013/0007867 A1* | 1/2013 | Sowatskey | H04L 63/0815 |
| | | | 726/8 |
| 2013/0031269 A1 | 1/2013 | Ramasamy | |
| 2013/0116976 A1 | 5/2013 | Kanemasa | |
| 2013/0116979 A1 | 5/2013 | Bhaskara | |
| 2013/0238759 A1 | 9/2013 | Ostrowski | |
| 2014/0173018 A1 | 6/2014 | Westphal et al. | |
| 2014/0348164 A1 | 11/2014 | Zhou et al. | |
| 2015/0365379 A1 | 12/2015 | Wu | |

OTHER PUBLICATIONS

Hampton, "Default HTTP Redirection When Domain Name Requested, With a Flashed DD-WRT Router", Jul. 30, 2012, downloaded from the internet at: http://serverfault.com/questions/412688/default-http-redirection-when-domain-name-requested-with-a-flashed-dd-wrt-route on Oct. 1, 2014, 3 pages.

OpenBSD, "PF: Redirection (Port Forwarding)", 2014, downloaded from the internet at: http://www.openbsd.org/faq/pf/rdr.html on Oct. 1, 2014, 3 pages.

Ridlen, "IPTables Tips and Tricks—Port Redirection", Dec. 26, 2011, downloaded from the internet at: http://blog.softlayer.com/2011/iptables-tips-and-tricks-port-redirection on Oct. 1, 2014, 2 pages.

\* cited by examiner

NETWORK TRAFFIC MANAGEMENT USING PORT NUMBER REDIRECTION

CROSS-REFERENCE TO RELATED APPLICATIONS

This application is a continuation application of and claims priority to U.S. application Ser. No. 15/273,534 filed Sep. 22, 2016, which is a continuation of U.S. application Ser. No. 14/987,486 filed Jan. 4, 2016 (now U.S. Pat. No. 9,473,586), which is a continuation of U.S. application Ser. No. 14/709,160, filed on May 11, 2015 (now U.S. Pat. No. 9,231,857), which is a continuation of U.S. application Ser. No. 14/566,587, filed on Dec. 10, 2014 (now U.S. Pat. No. 9,118,582.

BACKGROUND

The present disclosure generally relates to techniques for managing network traffic using port number redirection.

A computer network is a collection of computers and other hardware interconnected by communication channels that allow sharing of resources and information. Communication protocols define the rules and data formats for exchanging information in a computer network. Transport Layer Security (TLS) and Secure Socket Layer (SSL) are two examples of cryptographic communication protocols that provide communication security by allowing devices to exchange encrypted, as opposed to plaintext, messages.

SUMMARY

In general, one aspect of the subject matter described in this specification may be embodied in systems, and methods performed by data processing apparatuses that include the actions of receiving, from a device over a network, a first request that includes an address. The actions further include, in response to receiving the first request, determining, based at least in part on information included in the first request, that the first request is to be redirected. The actions further include in response to determining that the first request is to be redirected, sending, to the device over the network, a redirect message that includes the address and a port number. The actions further include receiving, from the device over the network, a second request that includes the address and the port number. The actions further include determining that the port number is included in a predetermined list of port numbers. The actions further include responsive to determining that the port number is on the predetermined list of port numbers, modifying the second request by removing the port number. The actions further include sending the modified second request to the address.

Implementations can include any, all, or none of the following features. The address includes a first port number and the port number is a second port number different than the first port number, and modifying the second request includes inserting the first port number into the second request. The actions further include maintaining data that corresponds, for each of a plurality of port numbers, a corresponding modified port number. Determining that the first request is to be redirected based at least in part on information included in the first request includes determining that first port number matches one of the plurality of port numbers in the maintained data. The second port number is the modified port number that corresponds to the matched port number in the plurality of port numbers in the maintained data. The actions further include receiving a message from the address, the message including the first port number; modifying the message by replacing the first port number with the second port number; and sending the message to the device. The actions further include receiving, from a device over a network, a third request that includes a second address and a third port number; in response to receiving the third request, determining that the third request is not to be redirected based at least in part on information included in the third request; and in response to determining that the third request is not to be redirected, sending the third request to the second address. The first request and the second request are Hypertext Transfer Protocol (HTTP) requests. Sending, to the device over the network, a redirect message including the address and a port number is performed by a network gateway; and receiving, from the device over the network, a second request that includes the address and the port number is performed by a proxy server that is a different device than the network gateway. The proxy server is configured to perform, for at least some network traffic, at least one of the group consisting of sandboxing traffic, caching resources, logging traffic, and blocking traffic. The proxy server handles traffic is a selective manner based on a port number of messages of the traffic. The proxy server serves resources through the Web Cache Communication Protocol (WCCP). Sending, to the device over the network, a redirect message including the address and a port number is performed by a particular device; and receiving, from the device over the network, a second request that includes the address and the port number is performed by the particular device.

Details of one or more implementations of the subject matter described in this specification are set forth in the accompanying drawings and the description below. Other features, aspects, and potential advantages of the subject matter will become apparent from the description, the drawings, and the claims.

DESCRIPTION OF DRAWINGS

Like reference symbols in the various drawings indicate like elements

DETAILED DESCRIPTION

Network traffic redirection may be used to selectively reroute certain network traffic (e.g., traffic from certain devices or users, traffic to certain destinations, etc.) so that it may be managed differently than other network traffic. For example, network traffic to a certain destination address may be rerouted through a server to examine its contents, apply a different network policy to the traffic, or to perform other operations. Some network protocols, such Hypertext Transfer Protocol (HTTP), provide messages used by a server to instruct a client to access a requested resource at an alternate location (e.g., by sending an HTTP REDIRECT message including a different URL to the client). Client programs, generally, will resend the request for the resource to the alternate location in response to receiving such a message.

The present disclosure describes techniques for managing network traffic using port number redirection. In one example method, a network router or other network device may receive, from a device over a network, a first request including an address (e.g., a URL). A determination is then made that the first request is to be redirected based at least in part on information included in the first request. In response to the determination, a redirect message including the address and a port number is sent to the device. A second request is then received from the device over the network including the address and the port number. The port number is determined to be included in a list of remapped port numbers. In response, the second request is modified by removing the port number, and the modified second request is sent to the address.

The techniques described herein may provide the following advantages. By redirecting network traffic based on port number, pointers in embedded content to relative references may be preserved, even when that content is routed through a proxy server. By redirecting based on port number, without changing the universal resource locator (URL) in the redirection, the user experience may remain unchanged as many browsers display only the URL and not the port number of a resource.

Figure 1:
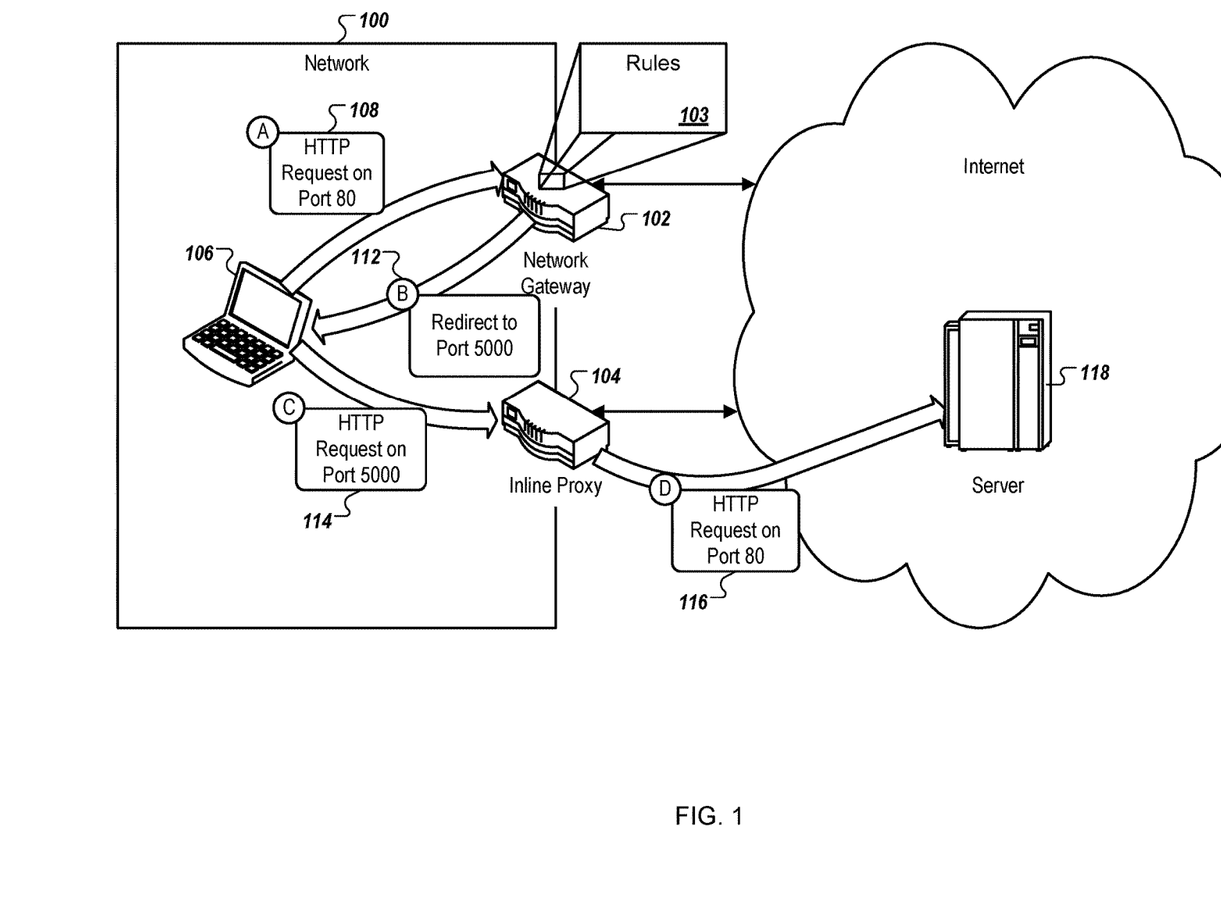
FIG. 1 is a block diagram of an example computer network for managing network traffic using port number redirection.

FIG. 1 is a block diagram of an example computer network 100 with a network gateway 102 and an inline proxy 104. Also shown in the network 100 is a browser device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106, network gateways 102, and/or inline proxies 104.

The network 100 can be configured to route some or all of the messages addressed outside the network 100 to the network gateway 102. The network gateway 102 can inspect the messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly.

For example, the network gateway 102 may intercept and examine a request message 108 from the browser device 106 that is addressed to a server 118. This request message may be, for example, a hypertext transfer protocol (HTTP) GET message that includes the universal resource locator (URL) of the server 118 and specifies port 80. Port numbers are generally application-specific or process-specific software construct serving as a communications endpoint in a computer's host operating system. The purpose of ports is often to identify different applications or processes running on a single computer and thereby enable them to share a single physical connection to a packet-switched network like the Internet. In the context of Internet Protocol (IP), a port is often associated with an IP address of the host, as well as the type of protocol used for communication. In some cases, the request message may not include a port number because the network service associated with the request is associated with a well-known port. For example, in the case of an HTTP GET request including a URL without a port number, a port number of "80" is implied because port "80" is generally associated with the HTTP network service. Other well-known ports include, but are not limited to, "20" for File Transfer Protocol (FTP), "23" for Telnet protocol, "25" for Simple Mail Transfer Protocol (SMTP), and others.

The network gateway 102 can compare, for example, the request message 108 to rules 103 that identify resources which should enter the network 100 through the inline proxy 104. If the network gateway 102 determines that the requested resource should enter the network 100 through the network gateway 102, the network gateway 102 can pass the request message 108 to the server 118. Alternatively, if the network gateway 102 determines that the requested resource should enter the network 100 through the inline proxy 104, the network gateway may instead respond to the request message 108 with a redirect message 112.

The redirect message 112 may be any message type appropriate to the protocol of the request message 108 that indicates that the requested resource is at a different location. Examples of HTML redirects include, but are not limited to, to server-side scripting, frame redirects, and Apache mod_rewrites. The redirect message 112 can include the same URL as the URL in the request message 108 but can contain a different port number. The different port number may be, for example, associated with the original port number in the rules 103. For example, the rules 103 may contain a mapping of port 80 to port 5000, and any request message 108 specifying port 80 that is redirected by the network gateway 102 may redirect to port 5000. Additional test or complexity may be included in the rules 103. For example, the port mapping may be one to many, with the redirected port selection including consideration of the client type of the browser device 106, load balancing within the network 100, different security concerns, etc.

The browser device 106 can receive the redirect message 112 and generate a new request message 114. This new request message 114 may include the same URL that is included in both the original request message 108 and the redirect message 112, and may contain the new port number contained in the redirect message 112.

Based on the port number of the request message 114, the network 100 can route the request message 114 to the inline proxy 104. That is, the network 100 may be configured such that, for some port numbers, messages addressed outside of the network 100 may be routed to the inline proxy 104, and other messages with some other port numbers may be routed to the network gateway 102.

In response to receiving the request message 114, the inline proxy 104 may modify the port number from 5000 to 80, for example based on a look-up table similar or the same as included in the rules 103. The inline proxy 104 may then pass this modified request 116 to the server 118 located at the URL of the request message 116. The server 118 may return the requested content to the inline proxy 104, which may take any appropriate proxy action on the returned content before passing, or not, the requested content to the browser device 106. Examples of the proxy actions possible for the inline proxy 104 include, but are not limited to, sandboxing traffic, caching resources, logging traffic, and blocking traffic. In some cases, such as the case of a request not including a port number described above, the request may be modified to remove the port number entirely, such as in a case where the request is directed to a network service having a well-known port (e.g., port 80 for HTTP).

Redirecting based on port number, as opposed to for example, URL remapping, provides for a number of technical and user experience implications. For example, a user that enters an address of the server 118 in the address bar of a web browser may never know that their traffic has been redirected, as many web browsers do not show the port on which a connection is made. Many webpages include embedded content that have relative path pointers. These relative paths are often completed into full path pointers based on the address of the document that loads them. By changing the port number and not the address of web pages, these relative path pointers can be completed correctly, allowing the content to be fetched and presented correctly.

In some implementations, the modified port numbers may be used to communicate some information to the inline proxy 104. In this example, port 80 is translated to port 5000. In another example, the network gateway 102 may translate port 80 to a port number from 5000 to 5003. When using port 5000, the network gateway 102 may be indicating that the traffic should be handled by the inline proxy 104 as default traffic. When using port 5001, the network gateway 102 may be indicating that the traffic should be handled as low permission or high security traffic and that additional security measures (e.g., sandboxing, anti-virus checking) should be performed. When the network gateway 102 uses port 5003, the network gateway 102 may be indicating that the traffic should be handled as high permission or low security traffic that should receive minimal security measures.

A single inline proxy 104 is shown in this example, but multiple inline proxies may be used. For example, the multiple inline proxies may be used to load-balance the network traffic. Additionally or alternatively, different inline proxies may be configured to perform different proxy actions. That is, a particular inline proxy may provide extra security analysis to traffic that is routed through it and another inline proxy may provide VPN connectivity with another network. In cases of multiple inline proxies, the network 100 may be configured to route request messages 114 to different inline proxies based on the port numbers they contain. In some other cases of multiple inline proxies, the network 100 may be configured to route request messages 114 with a particular port number to any available inline proxy.

Figure 2:
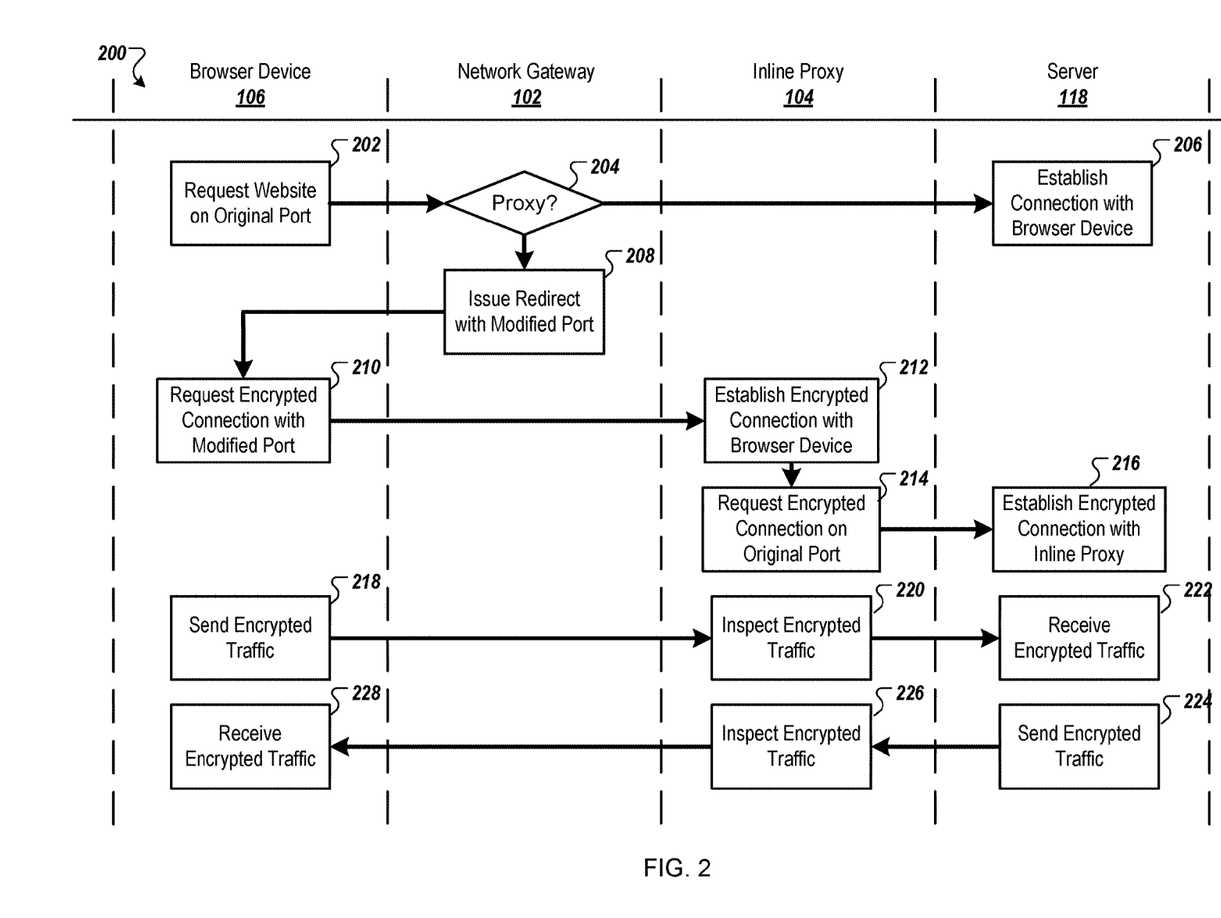
FIG. 2 is a swimlane diagram of an example process for managing network traffic using port number redirection.

FIG. 2 is a swimlane diagram of an example process 200 for managing network traffic. For clarity, the process 200 is being described with reference to the elements shown in FIG. 1. However, other components, including but not limited to those shown in FIG. 3, may be used to perform the process 200 or other processes.

The browser device 106 requests 202 a webpage with an original port number. For example, a user can load a web browser application and type an address https://www.example.com into the address bar of the web browser application. In response, the web browser application can generate a Transport Layer Security (TLS) Hello message. In the case of TLS, the Hello message is a request message to initiate an encrypted communication session. The TLS Hello message can include the address www.example.com on port 443, which is sometimes written as www.example.com: 443. Once created, the browser device 106 can send the TLS Hello message to the network gateway 102.

The network gateway 102 determines 204 if the request should be routed through a proxy. For example, the address www.example.com may be compared to a whitelist of permitted address or a black list of forbidden address. In another example, a feature of the browser device 106 may be used to determine that the TLS Hello should not be routed through a proxy. Such features of the browser device 106 can include, but are not limited to, user permission level, operating system type, browser type, and user group membership.

If the network gateway 102 determines 204 that the request should not be routed through a proxy, the server 118 establishes 206 a connection with the network gateway 102. For example, the network gateway 102 can pass the TLS Hello message to the server 118, and the server 118 and the client device 106 can establish a TLS session over which a resource at www.example.com may be serve to the browser device 106.

If the network gateway 102 determines 204 that the request should be routed through a proxy, the network gateway 102 issues 208 a redirect with a modified port number. For example, the network gateway 102 can issue a redirect message back to the browser device 106, specifying that the client device 106 should be redirected to www.example.com on port 6000, instead of the original port 443.

The browser device 106 can request 210 an encrypted connection with the modified port number. For example, the client device 106 can generate a new TLS Hello request message that includes the address www.example.com on port 6000 and send this new TLS Hello request message to the network 100 for routing. Instead of routing the new TLS Hello request message to the network gateway 102, the network 100 may determine that the port number falls within a range assigned to the inline proxy 104 and may route the new TLS Hello request message to the inline proxy 104. In this example, the new TLS Hello message may be generated and sent by the browser device 106 without any indication being shown to the user.

The inline proxy 104 can establish 212 an encrypted connection with the browser device 106 using the modified port number. The inline proxy 104 can, instead of for example routing the new TLS Hello request message to the server 118 associated with www.example.com, respond to the new TLS Hello request message by establishing a TLS encrypted session with the client browser 106. In some cases, the inline proxy 104 acting as the server 118 can be referred to as spoofing or proxying the server 118

The inline proxy 104 can request 214 an encrypted connection with the server 118 on the original port number. The server 118 can establish 216 an encrypted connection with the server 118 on the original port number. The inline proxy 104 can generate a third TLS Hello message that contains the address www.example.com and the original port number—port 433. The inline proxy 104 can establish a second TLS encrypted session that is with the server 118.

Once created, the inline proxy 104 will have two TLS encrypted sessions, one with the browser device 106 on port 6000 and one with the server 118 on port 433. These two connection may be set up and maintained independently, each with their own key-sharing agreement, etc.

The browser device 106 generates traffic, encrypts the traffic into a first encrypted form, and passes 218 the traffic to the inline proxy 104. The inline proxy 104 receives the traffic, decrypts the traffic, inspects 220 the traffic, encrypts the traffic into a second encrypted form, and passes the traffic to the server 118. The server 118 receives 222 the traffic in the second encrypted form.

For example, for traffic that originates with the browser device 106, the browser device 106 generates traffic addressed to www.example.com on port 6000 and encrypted with a key of the TLS encrypted session shared by the browser device 106 and the network gateway 102. This traffic is sent to the inline proxy 104, and the inline proxy 104 can decrypt the traffic with a key of the TLS encryption session shared by the browser device 106 and the network gateway 102. Next, the inline proxy 104 can perform any, or no, proxy actions that the inline proxy 104 is configured to perform. The inline proxy may then change the port number of this traffic from 6000 to 433 and encrypt the traffic with a key of the TLS encryption session shared by the server 118 and the inline proxy 104 for transmission to the server 118.

The server 118 generates traffic, encrypts the traffic into a third encrypted form, and passes 224 the traffic to the inline proxy 104. The inline proxy 104 receives the traffic, decrypts the traffic, inspects 226 the traffic, encrypts the traffic into a fourth form, and passes the traffic to the browser device 106. The browser device 106 receives 228 the encrypted traffic.

For example, for traffic that originates with the server 118, the server 118 generates traffic addressed to www.example.com on port 433 and encrypted with a key of the TLS encrypted session shared by the server 118 and the network gateway 102. This traffic is sent to the inline proxy 104, and the inline proxy 104 can decrypt the traffic with a key of the TLS encryption session shared by the server 118 and the network gateway 102. Next, the inline proxy 104 can perform any, or no, proxy actions that the inline proxy 104 is configured to perform. The inline proxy may then change the port number of this traffic from 433 to 6000 and encrypt the traffic with a key of the TLS encryption session shared by the browser device 106 and the inline proxy 104 for transmission to the browser device 106.

A particular number, type, and order of actions are described in the process 200. However, other number, types, and orders of action are possible. For example, other protocols may be used, including protocols that do no establish encrypted communication channels (e.g., HTTP or Simple Mail Transport Protocol (SMTP)). In this example, the port number of the redirection is never shown to the user of the web browser. In some other example, the port number of the redirections may be shown to the user. For example, if the user is using a telnet terminal, the redirect message, including the redirected port number, may be shown to the user.

Figure 3:
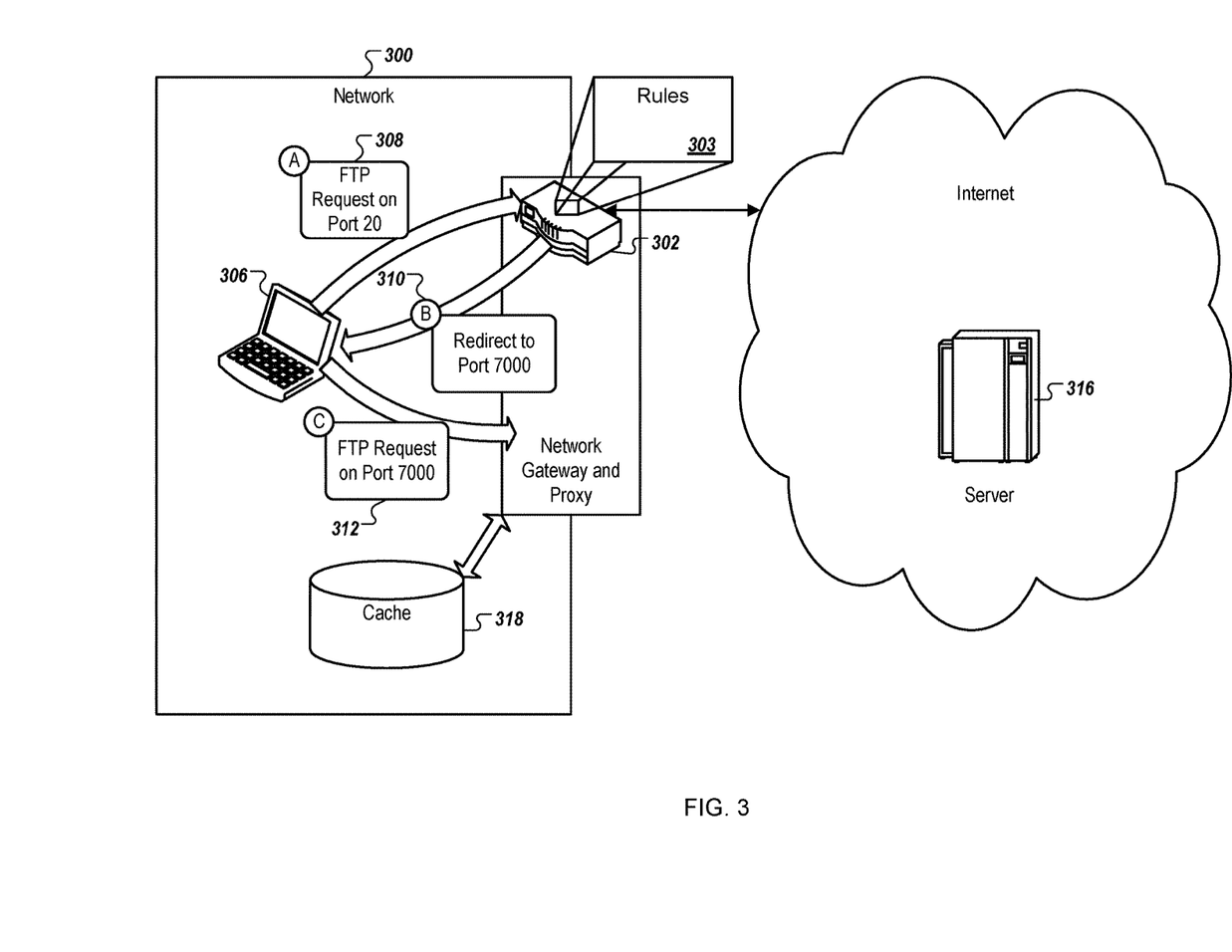
FIG. 3 is a block diagram of an example computer network for managing network traffic using port number redirection.

FIG. 3 is a block diagram of an example computer network 300 with a single device 302 that acts as a network gateway and inline proxy. Also shown in the network 300 is a browser device 306 and a cache 318. The cache 318 represents any appropriate computing device capable of storing cached web content and serving that content in response to requests. While not shown for clarity's sake, the network 300 can include other elements including, but not limited to, wireless and/or wired access points, file and/or application servers, routers, and network cables, as well as additional browser devices 306, devices 302, and/or caches 318.

The network 300 can be configured to route some or all of the messages addressed outside the network 300 to the device 302. The device 302 can inspect the message and, optionally, modify or drop some messages. For example, the device 302 may be configured to prevent traffic from a particular class of application (e.g., chat, files sharing). The device 302 may also be configured to intercept messages intended for a recipient outside the network 300 and reply directly.

For example, the device 302 may intercept and examine a request message 308 from the browser device 306 that is addressed to a server 316. This request message may be, for example, a File Transport Protocol (FTP) message that includes the URL of the server 316 and specifies port 20.

The device 302 can compare, for example, the request message 308 to rules 303 that identify resources which can be served out of the cache 318. If the device 302 determines that some of the requested resources cannot be served out of the cache 318, the device 302 can pass the request message 308 to the server 316. Alternatively, if the device 302 determines that the requested resource should be served out of the cache 318, the device 302 may instead respond to the request message 308 with a redirect message 310 containing the same URL and a different port number.

The browser device 306 can receive the redirect message 310 and generate a new request message 312. The new request message 312 may include the same URL that is included in the original request message 307 and the redirect message 112, and may contain the new port number contained in the redirect message 310.

The network 300 can route the request message 312 to the device 302. In response to receiving the request message 312, and instead of passing the request message to the server 316, the device 302 can respond by serving the requested resource from the cache 318. For example, the device 302 may serve the requested resource from the cache 318 using the Web Cache Communication Protocol (WCCP) or any other technologically appropriate process.

A single request for a single resource is shown here. However, the network 300 can be used to route multiple requests for different resources. For example, the client device 306 may request a webpage from the server 316. The webpage may identify two resources to be embedded in the webpage (e.g., images, audio files, script objects). The browser device 306 may make two separate requests, one for each of the two resources to be embedded in the webpage. In this example, a copy of one of the resources is stored in the cache 318 and one is not. The request for the resource that is not stored in the cache 318 can be routed out to the server 316 for service. The request for the resource that is stored in the cache 318 can be redirected to a different port number, and ultimately served from the cache 318 instead of the server 316.

Although not shown here, the cache 318 or another cache may be used in a different network that includes, instead of the device 302, a network gateway and one or more inline proxies. Additionally, the device 302 or a similar device may be used for any appropriate proxy action, including but not limited to but are not limited to, sandboxing traffic, caching resources, logging traffic, and blocking traffic.

Figure 4:
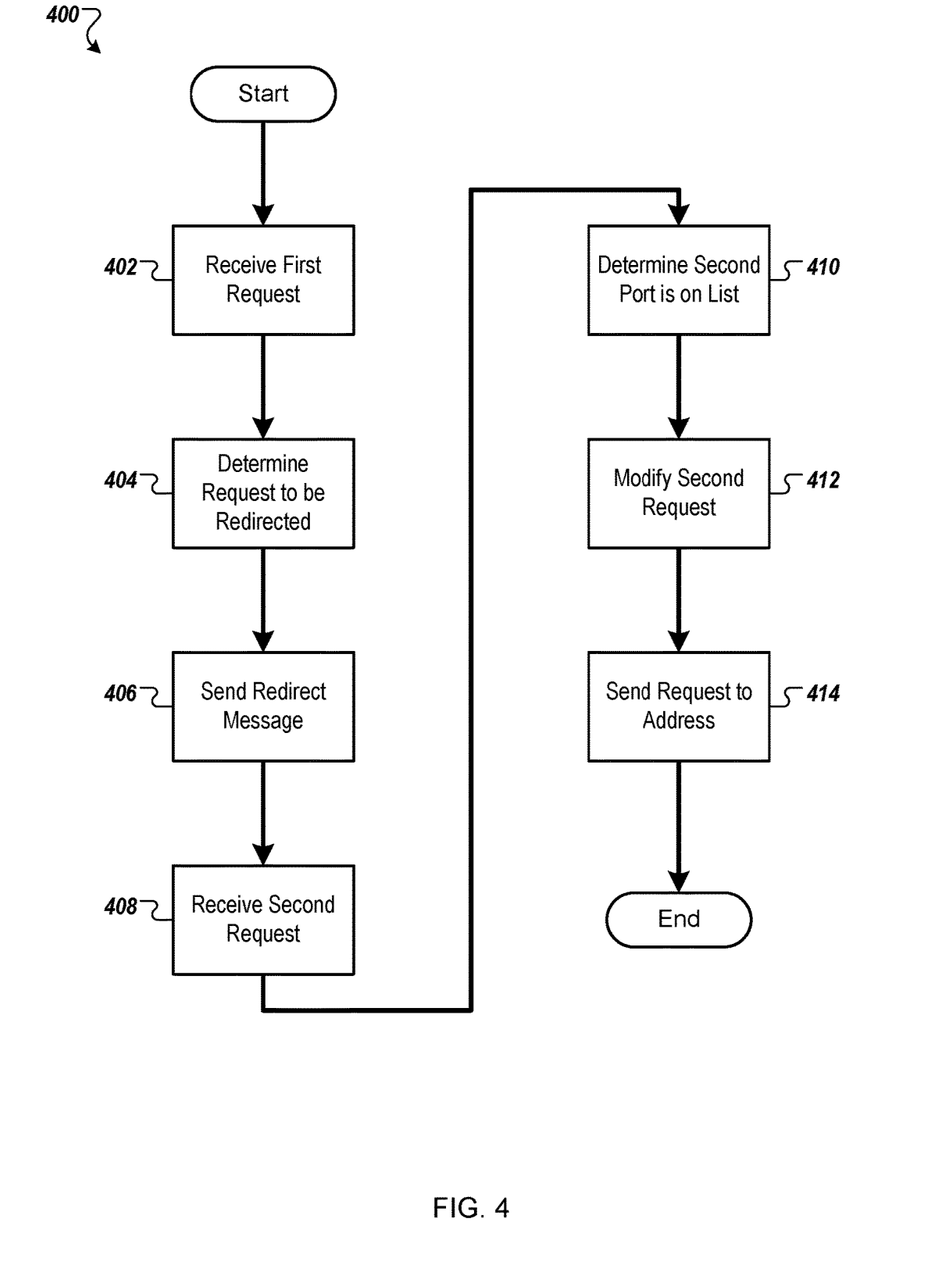
FIG. 4 is a flowchart of an example process for managing network traffic using port number redirection.

FIG. 4 is a flowchart of an example process 400 for managing network traffic. A first request is received 402 from a device over the network. The first request comprises an address and a first port number. For example, a network attached device may receive a command from a computer that is on the same network. That command may include an address to which the command is to be routed, and a port number.

In response to receiving the first request, the first request is determined 404 to be redirected based at least in part on the information included in the first request. For example, the network attached device may examine some information of the command (e.g., what kind of command it is, which device issued the command) to determine if the command is to be redirected.

In response to determining that the first request is to be redirected, a redirect message is sent 406 to the device over the network. The redirect message contains the address and a second port number. For example, the network attached device may issue back, to the computer that is on the same network, a redirect message. The redirect message may include the same address, but a different port number.

A second request is received 408 from the device over the network. The second request contains the address and the second port number. For example, a network edge system may receive a second request that was sent by the device that is attached to the network. The second request may contain the original address and the port number of the redirect message.

The second port number is determined 410 to be on a list of values. For example, the network edge system may compare the port number to a mapping of port values to determine if the received port value is in the mapping.

Responsive to determining that the second port number is on the list of values, the second request is modified 412 by replacing the second port number with the first port number. For example, if the network edge system determines that the received port value is in the mapping, the network edge system can replace the received port value with another port value identified by the mapping.

The modified second request is sent 414 to the address. For example, the network edge system can pass the modified received message to the internet or another network to be routed to the address of the message.

A particular number, type, and order of actions are described in the process 400. However, other number, types, and orders of action are possible. For example, instead of sending the modifying the second request and sending it to the address, a system or device can respond to the request, even if that system or device was not identified in the second request.

Figure 5:
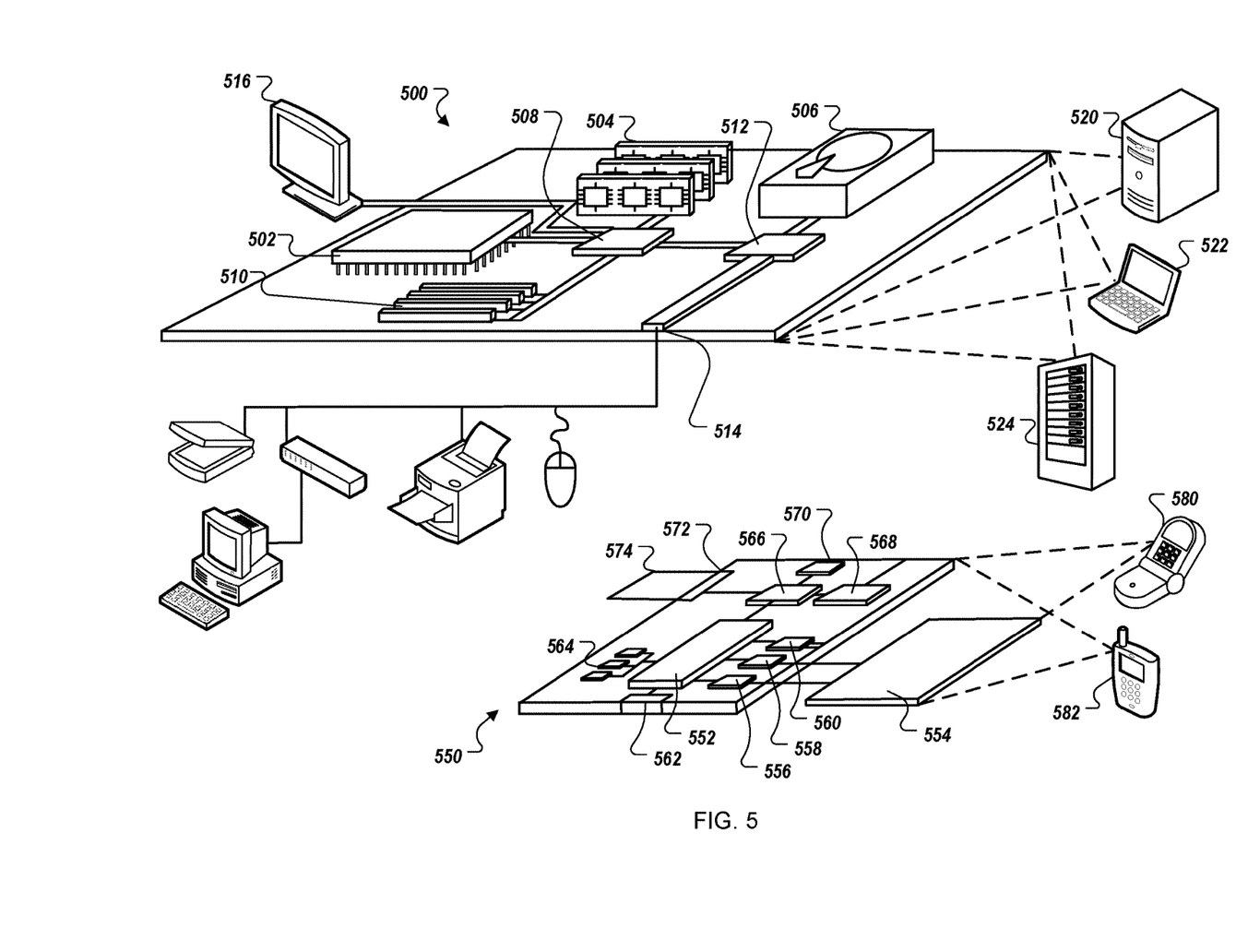
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

What is claimed is:

1. A method performed by data processing apparatuses, the method comprising:
   receiving, from a device over a network, a first request that includes an address;
   in response to receiving the first request, determining, based at least in part on information included in the first request, that the first request is to be redirected;
   in response to determining that the first request is to be redirected, selecting a first port number out of a collection of possible port numbers wherein selecting a first port number out of a collection of possible port numbers comprises:
     identifying a handling rule for handling the request;
     identifying a port number that is associated with the handling rule;
   sending, by a network gateway and to the device over the network, a redirect message that includes the address and the first port number;
   receiving, by a proxy server that is a different device than the network gateway and from the device over the network, a second request that includes the address and the first port number, wherein the proxy server serves resources through the Web Cache Communication Protocol (WCCP);
   determining that the first port number is included in a predetermined list of first port numbers;
   responsive to determining that the first port number is on the predetermined list of port numbers, modifying the second request by removing the first port number wherein modifying the second request by removing the first port number comprises modifying the second request according to the handling rule; and
   sending the modified second request to the address.

2. The method of claim 1, wherein determining that the first port number is included in a predetermined list of port numbers comprises determining that the first port number is one of the collection of possible port numbers.

3. The method of claim 1, wherein the address includes a second port number different than the first port number, and modifying the second request includes inserting the second port number into the second request.

4. The method of claim 1, wherein the proxy server is configured to perform, for at least some network traffic, at least one of the group consisting of sandboxing traffic, caching resources, logging traffic, and blocking traffic.

5. A system comprising:
   at least one processor; and
   computer-readable media having tangibly encoded instructions that, when executed by the at least one processor, cause the at least one processor to perform operations comprising:
   receiving, from a device over a network, a first request that includes an address;
   in response to receiving the first request, determining, based at least in part on information included in the first request, that the first request is to be redirected;
   in response to determining that the first request is to be redirected, selecting a first port number out of a collection of possible port numbers wherein selecting a first port number out of a collection of possible port numbers comprises:
     identifying a handling rule for handling the request;
     identifying a port number that is associated with the handling rule;
   sending, by a network gateway and to the device over the network, a redirect message that includes the address and the first port number;
   receiving, by a proxy server that is a different device than the network gateway and from the device over the network, a second request that includes the address and the first port number, wherein the proxy server serves resources through the Web Cache Communication Protocol (WCCP);
   determining that the first port number is included in a predetermined list of first port numbers;
   responsive to determining that the first port number is on the predetermined list of port numbers, modifying the second request by removing the first port number wherein modifying the second request by removing the first port number comprises modifying the second request according to the handling rule; and
   sending the modified second request to the address.

6. The system of claim 5, wherein determining that the first port number is included in a predetermined list of port numbers comprises determining that the first port number is one of the collection of possible port numbers.

7. The system of claim 5, wherein the address includes a second port number different than the first port number, and modifying the second request includes inserting the second port number into the second request.

8. The system of claim 5, wherein the proxy server is configured to perform, for at least some network traffic, at least one of the group consisting of sandboxing traffic, caching resources, logging traffic, and blocking traffic.

9. A non-transitory computer-readable media having tangibly encoded instructions that, when executed by at least one processor, cause the at least one processor to perform operations comprising:
   receiving, from a device over a network, a first request that includes an address;
   in response to receiving the first request, determining, based at least in part on information included in the first request, that the first request is to be redirected;

in response to determining that the first request is to be redirected, selecting a first port number out of a collection of possible port numbers wherein selecting a first port number out of a collection of possible port numbers comprises:
  identifying a handling rule for handling the request;
  identifying a port number that is associated with the handling rule;
sending, by a network gateway and to the device over the network, a redirect message that includes the address and the first port number;
receiving, by a proxy server that is a different device than the network gateway and from the device over the network, a second request that includes the address and the first port number, wherein the proxy server serves resources through the Web Cache Communication Protocol (WCCP);
determining that the first port number is included in a predetermined list of first port numbers;
responsive to determining that the first port number is on the predetermined list of port numbers, modifying the second request by removing the first port number wherein modifying the second request by removing the first port number comprises modifying the second request according to the handling rule; and
sending the modified second request to the address.

10. The computer-readable media of claim 9, wherein determining that the first port number is included in a predetermined list of port numbers comprises determining that the first port number is one of the collection of possible port numbers.

11. The computer-readable media of claim 9, wherein the address includes a second port number different than the first port number, and modifying the second request includes inserting the second port number into the second request.

12. The computer-readable media of claim 9, wherein the proxy server is configured to perform, for at least some network traffic, at least one of the group consisting of sandboxing traffic, caching resources, logging traffic, and blocking traffic.

* * * * *